(12) United States Patent
Koopmann et al.

(10) Patent No.: US 11,065,809 B2
(45) Date of Patent: Jul. 20, 2021

(54) APPARATUS AND METHOD FOR PRODUCING A THREE- DIMENSIONAL OBJECT BUILT UP FROM AT LEAST ONE MATERIAL LAYER

(71) Applicant: Volkswagen Aktiengesellschaft, Wolfsburg (DE)

(72) Inventors: Julian Koopmann, Braunschweig (DE); Fabian Fischer, Hannover (DE); Knut Schmidt, Isenbuettel (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 93 days.

(21) Appl. No.: 16/451,862

(22) Filed: Jun. 25, 2019

(65) Prior Publication Data

US 2019/0389129 A1 Dec. 26, 2019

(30) Foreign Application Priority Data

Jun. 25, 2018 (DE) ...................... 10 2018 210 282.1

(51) Int. Cl.
*B29C 64/343* (2017.01)
*B29C 64/153* (2017.01)
(Continued)

(52) U.S. Cl.
CPC .......... *B29C 64/153* (2017.08); *B29C 64/245* (2017.08); *B29C 64/268* (2017.08);
(Continued)

(58) Field of Classification Search
CPC ... B29C 64/153; B29C 64/268; B29C 64/245; B29C 64/343; B29C 64/282;
(Continued)

(56) References Cited

U.S. PATENT DOCUMENTS

| 4,227,835 A | 10/1980 | Nussbaum | |
| 10,081,132 B2 * | 9/2018 | Dawson | B33Y 10/00 |

(Continued)

FOREIGN PATENT DOCUMENTS

| CN | 105081319 A | 11/2015 |
| CN | 105291442 A | 2/2016 |

(Continued)

OTHER PUBLICATIONS

Chinese Office Action dated Feb. 20, 2021 in corresponding application 201910542533.5.

*Primary Examiner* — Joseph S Del Sole
*Assistant Examiner* — Margaret B Hayes
(74) *Attorney, Agent, or Firm* — Muncy, Geissler, Olds & Lowe, P.C.

(57) ABSTRACT

An apparatus and to a method for producing a three-dimensional object built up from at least one material layer by selective solidification of at least one powder raw material applied successively in raw material tracks to a build platform via an application unit of the apparatus. In this case, the apparatus for solidifying the raw material via energy input from a beam has an irradiation unit forming a build group together with the application unit, wherein the irradiation unit having a contiguous group of irradiation elements is rotatably mounted on the application unit.

14 Claims, 3 Drawing Sheets

(51) Int. Cl.
*B29C 64/268* (2017.01)
*B29C 64/245* (2017.01)
*B29C 64/282* (2017.01)
*B33Y 40/00* (2020.01)
*B33Y 30/00* (2015.01)
*B33Y 10/00* (2015.01)

(52) U.S. Cl.
CPC .......... *B29C 64/282* (2017.08); *B29C 64/343* (2017.08); *B33Y 10/00* (2014.12); *B33Y 30/00* (2014.12); *B33Y 40/00* (2014.12)

(58) Field of Classification Search
CPC ... B29C 64/241; B29C 64/205; B29C 64/255; B29C 64/336; B29C 64/393; B22F 2003/1058; B22F 2003/1056; B22F 3/1055; B22F 2003/1057; B28B 1/001
See application file for complete search history.

(56) References Cited

U.S. PATENT DOCUMENTS

| | | | |
|---|---|---|---|
| 10,399,145 B2 | 9/2019 | McMurtry et al. | |
| 10,806,550 B2* | 10/2020 | Lyu | A61C 13/0018 |
| 2006/0105102 A1* | 5/2006 | Hochsmann | B29C 41/36 |
| | | | 427/180 |
| 2014/0263209 A1* | 9/2014 | Burris | B22F 3/105 |
| | | | 219/121.62 |
| 2015/0316368 A1* | 11/2015 | Moench | G01B 11/254 |
| | | | 348/46 |
| 2016/0072258 A1* | 3/2016 | Seurin | G06K 9/0014 |
| | | | 348/46 |
| 2016/0122854 A1 | 5/2016 | Schwander et al. | |
| 2017/0072633 A1 | 3/2017 | Hsu | |
| 2017/0072636 A1* | 3/2017 | Ng | B29C 64/205 |
| 2018/0215092 A1* | 8/2018 | Dudley | B29C 64/20 |
| 2018/0281278 A1 | 10/2018 | George et al. | |
| 2018/0326655 A1* | 11/2018 | Herzog | B29C 64/153 |
| 2019/0061242 A1 | 2/2019 | Herzog | |
| 2019/0105837 A1* | 4/2019 | Zehavi | B29C 64/336 |
| 2019/0329323 A1 | 10/2019 | McMurtry et al. | |

FOREIGN PATENT DOCUMENTS

| | | |
|---|---|---|
| CN | 205086362 U | 3/2016 |
| CN | 205310848 U | 6/2016 |
| CN | 106794519 A | 5/2017 |
| DE | 102013114003 A1 | 6/2015 |
| DE | 102014004633 A1 | 10/2015 |
| DE | 102016105097 A1 | 9/2017 |
| WO | WO2014199149 A1 | 12/2014 |
| WO | WO2014199194 A1 | 12/2014 |
| WO | WO2017127061 A1 | 7/2017 |

* cited by examiner

APPARATUS AND METHOD FOR PRODUCING A THREE- DIMENSIONAL OBJECT BUILT UP FROM AT LEAST ONE MATERIAL LAYER

This nonprovisional application claims priority under 35 U.S.C. § 119(a) to German Patent Application No. 10 2018 210282.1, which was filed in Germany on Jun. 25, 2018, and which is herein incorporated by reference.

BACKGROUND OF THE INVENTION

Field of the Invention

The present invention relates to an apparatus for producing a three-dimensional object built up from at least one material layer by selective solidification of at least one powder raw material applied successively to a build platform by means of an application unit of the apparatus. In this case, the apparatus for solidifying the raw material by means of energy input from a beam has an irradiation unit forming a build unit together with the application unit. Furthermore, the invention also relates to a method for producing a three-dimensional object built up from at least one material layer with the apparatus by forming a bed of powder raw material by successive application of raw material tracks and selective solidification of the raw material tracks by means of energy input from a beam during the application.

Description of the Background Art

Different methods are known for the additive manufacturing of components in a powder bed. A standard procedure is to lower a build plate or the powder bed by a defined height and to apply a layer of powder using a central coating apparatus. The applied powder layer is then exposed to the laser beam from a laser source or a plurality of punctiform laser sources according to the part areas to be produced, the laser beam usually being deflected by a mirror scanner system. In the exposed areas, due to the energy input, melting or sintering of the powder takes place, as a result of which the desired part areas are produced.

WO 2014/199149 A1, which corresponds to US 2016/0136730, for example, shows such a method or apparatus for carrying out such a method. In this case, in addition to the use of laser beam which is deflected by a scanner system and is generated by stationary laser sources, the arrangement of a laser source which is formed of multiple laser diodes and is designed to be movable is described in one embodiment. The laser beams generated via the laser diodes are also focused by means of microlenses and are used to melt the powder, applied by means of a powder application unit arranged separately from the laser source, in the powder bed.

DE 10 2015 119 745 A1, which corresponds to US 2018/0326655, discloses a further apparatus which is comparable to WO 2014/199149 A1 and in which multiple laser diodes arranged essentially in the form of a matrix are used to generate the laser beam necessary for melting the powder. The laser diodes can be attached movably or immovably to a mounting device arranged above a powder bed, wherein the matrix-shaped arrangement of the laser diodes spans a part of the powder bed region to be exposed or even completely covers it. In one embodiment, a powder application unit, which is embodied separately from the laser diode arrangement, is additionally arranged on the mounting device, wherein this is designed to be horizontally movable relative to the mounting device and the powder bed.

A method and an apparatus of the aforementioned type is disclosed by DE 10 2016 105 097 A1, which corresponds to US 2019/0061242, and which has a stationary combined coating and illumination assembly. Here, the illumination device formed of two row-like and/or column-like laser diode arrays between which the coating device is disposed. As a result, during the horizontal movement of a carrier plate receiving the powder bed, the applied powder can be melted in both directions of movement. To this end, the powder to be applied can be fed to the coating device via a storage unit. Due to the arrangement of the laser diodes in two parts, which are separated from one another by the illumination device, two directions of movement can be covered, but a possible exposure is also disadvantageously limited to these two directions of movement.

SUMMARY OF THE INVENTION

It is therefore an object of the present invention to provide an apparatus such that a virtually arbitrary direction of movement with the simultaneous possibility of solidifying the raw material is made possible. Furthermore, the invention is based on the object of providing a method by means of which the properties of the object to be produced can be influenced.

According to an exemplary embodiment of the invention, an apparatus is thus provided for producing a three-dimensional object built up from at least one material layer, in particular a plurality of material layers. Here, the production of the object or the material layer or layers takes place by selective solidification of at least one powder raw material successively applied by an application unit of the apparatus on a build platform. For solidifying the raw material by means of energy input from a beam, the apparatus has in particular a laser beam, an irradiation unit forming a build unit together with the application unit. This irradiation unit is rotatably mounted on the application unit and in turn itself has—in particular solely—a contiguous group of irradiation elements. This design advantageously results in that the build unit formed of the application and irradiation unit moves in an arbitrary direction and thus the application and solidification of the powder raw material need not exclusively take place in a straight, optionally alternating movement in one direction. In addition to linear movements in one or two directions in an application plane of the build platform, any composite movements, such as movement on circular paths or a spiral movement, are also conceivable in the embodiment of the invention. In this case, the irradiation device would only need to be positioned by an adjusted rotational movement always in the direction of movement following the application unit. Even if a preferred movement, present in this case, represents the movement of the application plane of the build platform in a meandering path, only one contiguous group of irradiation elements is necessary for the successive alternating linear directions of movement of the build group, which in particular represents an advantageously simpler structure and cost reduction compared with an arrangement of multiple fixed groups of irradiation elements, which would have to be arranged around the application unit. In order to realize the movements of the application group, it is conceivable that the build group is arranged, for example, on an XY portal or on an XY articulated robot. In addition to the already mentioned and preferred laser beam, radiation in the form of one or more electron beams could also find use for solidification of the powder raw material. How the solidification of the raw material occurs in general depends on the nature of the raw material. One possibility, e.g., is to melt the raw material, whereby it is solidified by cooling to a solid material. Another possibility is the solidification of the raw material based on a sintering process in which the powder raw material is not converted into a liquid state but a solidification also occurs. Suitable raw materials in this case include, inter alia, metals and plastics.

The irradiation unit can have, on its underside facing the build platform, a plurality of irradiation elements, in particular arranged in a row transverse to the application direction and formed as laser diodes, for producing the beam formed as a laser beam. In this case, each of the laser diodes can additionally have an optical system for beam shaping and/or beam focusing of the radiation, in which case the radiation being a corresponding laser beam. To protect the laser diodes, in addition a protective gas stream, e.g., of argon or nitrogen may be provided, which flows between the laser diodes and the bed of powder raw material or the surface of the build platform and protects the laser diode and/or the optical system from back-flowing, possibly molten raw material. In addition to the arrangement of the laser diodes in a row, it is also conceivable to arrange the laser diodes on a circular path or on a partial circular path in order to be able to ensure a compact arrangement of the irradiation unit about the application unit.

An embodiment of the invention further is to be considered profitable if the irradiation elements can be controlled individually, whereby, on the one hand, the width of the area solidified by irradiation in the powder raw material changes, and also non-solidified intermediate areas can be produced by deactivating the irradiation elements corresponding to the areas not to be solidified.

In an embodiment of the apparatus, the laser diodes can be VCSEL diodes and/or VECSEL diodes. Here, VCSEL stands for vertical-cavity surface-emitting laser and VECSEL for vertical-external-cavity surface-emitting laser. In both cases, therefore, there are laser diodes which are surface emitters. In contrast to the edge-emitting laser diodes, in these the emitted light is radiated perpendicular to the plane of the semiconductor chip, resulting in an extremely compact construction and, in addition, an additional beam-shaping and/or beam-focusing optical system can be dispensed with.

If the number of laser diodes is at least 100, between 100 and 1000, or more than 1000, advantageously a high resolution and, associated therewith, small structure widths can be achieved.

A further exemplary embodiment provides that the apparatus has at least two application units or build groups, as a result of which not only a raw material of a substance can be profitably applied, but at least two or more raw materials of in particular substances different from one another. These can be, for example, different metals, which have different physical, in particular mechanical, properties and/or chemical properties. In this case, the different raw materials could be used for producing different regions of the object itself or also for producing required support structures, e.g., in regions of the object with overhangs.

If an embodiment of the invention is also designed such that the width of the powder raw material, applied successively to the build platform by means of an application unit, and/or the width of the irradiation area, covered by an irradiation unit, in the raw material applied to the build platform are 0.5 millimeters to 2 millimeters, then this is considered to be advantageous in that very small structure widths of, e.g., solidified structures of the object or support structures as well can be achieved, in particular in connection with a high number of laser diodes used such as at least 100, between 100 and 1000, or more than 1000. In this case, it is possible, for example, to achieve low wall thicknesses which can be in a range of 0.1 millimeter to 0.2 millimeters.

The application unit can have a metering device comprising a rotatably arranged first metering plate and a stationary second metering plate, working together with the first metering plate, and/or a vibration device for motion excitation of the powder raw material. In this way, the amount, e.g., measured in volume or mass, of the raw material, which is to emerge from an outlet opening of the application unit, can be controlled or regulated in a structurally simple, profitable manner. In this regard, the metering plates should have a hole circle, for example, with four openings each, wherein the emerging amount of raw material can be changed by a rotation of the hole circles of the adjacent metering plates. In addition to the metering plates and the vibration device, the application unit should also have a reservoir for the powder raw material to be applied and a squeegee, arranged on the application unit, for planarizing the raw material applied to the build platform.

A method is provided furthermore for producing a three-dimensional object built up from at least one material layer, for example, a plurality of material layers, with the apparatus. Here, the production of the object is accomplished by forming a bed of powder raw material by successive application of raw material tracks and selective solidification of the raw material tracks by means of energy input from a beam during the application. The successive application of the raw material tracks takes place here as a function of a first requirement profile of chemical and/or physical properties of the object to be produced with a layer thickness of the raw material tracks in a first layer thickness range up to 100 micrometers. The applied bed of powder raw material should in this case be formed over its entire surface and cover at least a base area which can be determined by projecting the object into the plane of the build platform. In a simplified manner, a rectangular base area can be formed. The layer thickness range is set in this case by means of a movement, directed at least in the vertical direction, of the build group but preferably of the build platform. The vertically directed movement in the simplest case thus includes a lowering, therefore, a vertical movement opposite to the build group, of the build platform relative to the build group made immovable in the vertical direction. The first requirement profile for the chemical and/or physical properties of the object can be defined above all with regard to necessary mechanical properties, e.g., in structurally stressed areas of the object. Such areas would be produced correspondingly with a layer thickness of the raw material tracks of up to 100 micrometers and thus corresponding material layer thicknesses of the object. Also conceivable is a definition of the requirement profile with regard to electrical properties, therefore of an embodiment, of specific regions as an electrical conductor or insulator or a necessary chemical corrosion resistance, in this case in particular in connection with more than one build group disposed on the apparatus.

In a highly promising refinement of the method of the invention, moreover, the successive application of raw material tracks takes place as a function of a second requirement profile for chemical and/or physical properties of the object to be produced, for producing support structures to be solidified for the object and/or for producing bed areas which are not to be solidified with a layer thickness of the raw material tracks in a second layer thickness range of 100 microns to 2 millimeters. In a manner similar to the first requirement profile, the second requirement profile for the chemical and/or physical properties of the object can be defined above all with regard to necessary mechanical properties of regions of the object and thus of at least parts of the object's material layers to be produced or produced. In this case, however, it should in particular be considered that structurally less stressed areas of the object in which lower demands on material properties are made compared with more heavily stressed areas are produced with an increased layer thickness in the layer thickness range of 100 micrometers to 2 millimeters of the raw material tracks and thus corresponding material layer thicknesses of the object. This also applies to support structures as well as to non-solidified areas of the bed of the powder raw material. The layer thickness ranges can be varied during the execution of the method.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
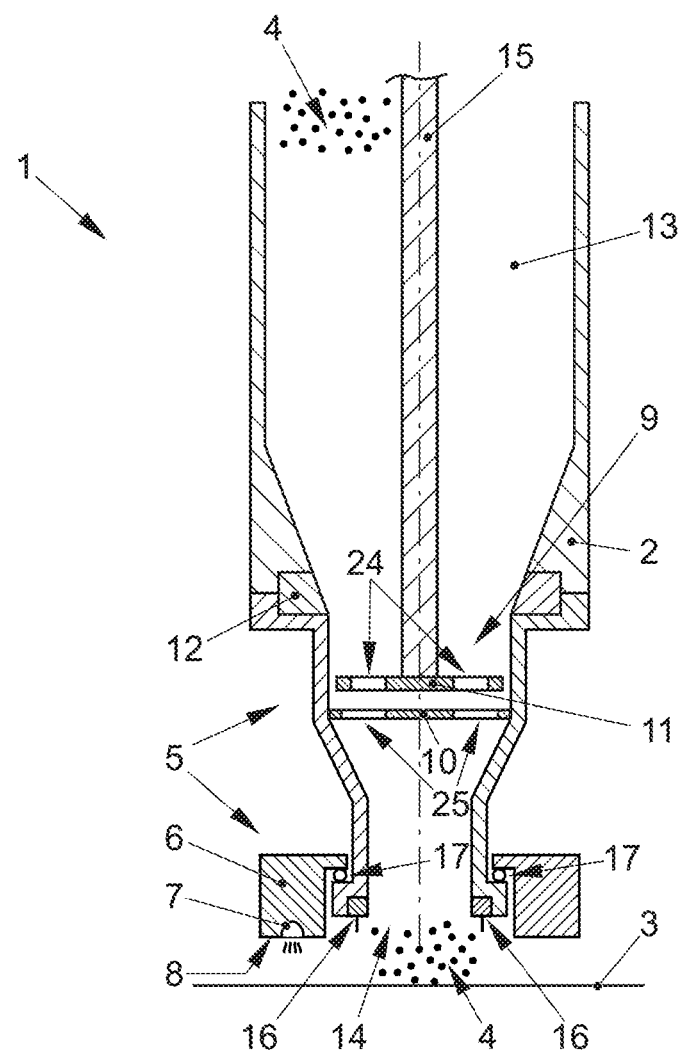
FIG. 1 shows an embodiment of the apparatus according to the invention.

FIG. 1 shows apparatus 1 for producing a three-dimensional object built up from at least one material layer. The object is produced here by selective solidification of raw material 4 applied to build platform 3 in multiple material layers. Raw material 4 is for this purpose applied from reservoir 13 of application unit 2 via its outlet opening 14 to build platform 3, as a result of which in addition to the solidified areas of the object, a full-surface bed of non-solidified, powder raw material 4, and optionally support structures are likewise produced. The amount of raw material 4, supplied from outlet opening 14, can also be controlled or regulated by means of first metering plate 10, made rotatable via shaft 15, and second metering plate 11, forming metering unit 9 with first metering plate 10 and fixedly connected to the wall of application unit 2. For this purpose, metering plates 10, 11 each have hole circles 24, 25, each with four holes, two of the holes being shown in the sectional view. Furthermore, application unit 2 has vibration device 12 for the motion excitation of powder raw material 4 and squeegee 16 for planarizing raw material 4 applied to build platform 3. Irradiation unit 6 forming build group 5 with application unit 2 is used for the solidification of powder raw material 4. Irradiation unit 6 having a contiguous group of irradiation elements 7 is rotatably mounted on application unit 2 via bearing 17 in the region of outlet opening 14, and irradiation elements 7 are arranged on underside 8 of irradiation unit 6, said underside facing build platform 3. In this embodiment of apparatus 1, irradiation elements 7 are formed as laser diodes in the form of VCSEL diodes, wherein a number of at least 100 are arranged on underside 8 of irradiation unit 6.

Figure 2:
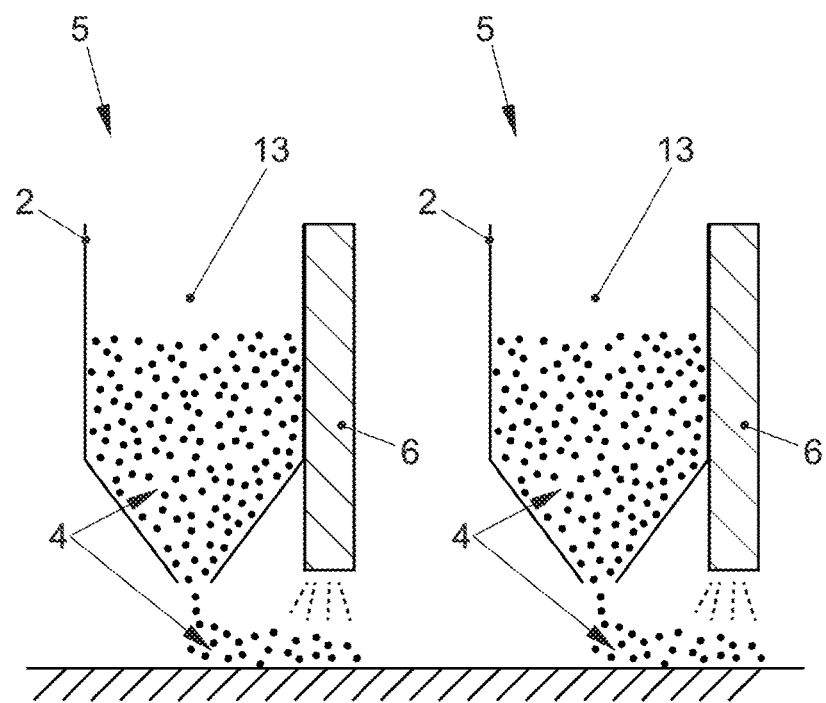
FIG. 2 shows a refinement with two build groups.

FIG. 2 shows a greatly simplified schematic illustration of an embodiment with two build groups 5, each of which includes an application unit 2 and irradiation unit 6 rotatably mounted on application unit 2. Build groups 5 are in this case arranged one behind the other in the application direction in order to apply different raw materials 4 from the respective reservoir 13 to build platform 3. Such an embodiment can also be used to produce the different layer thickness ranges as a function of the first requirement profile and the second requirement profile, wherein one of the build groups 5 is assigned to the first requirement profile and the second build group 5 is assigned to the second requirement profile. A combination with different raw materials 4 is possible in this case.

Figure 3:
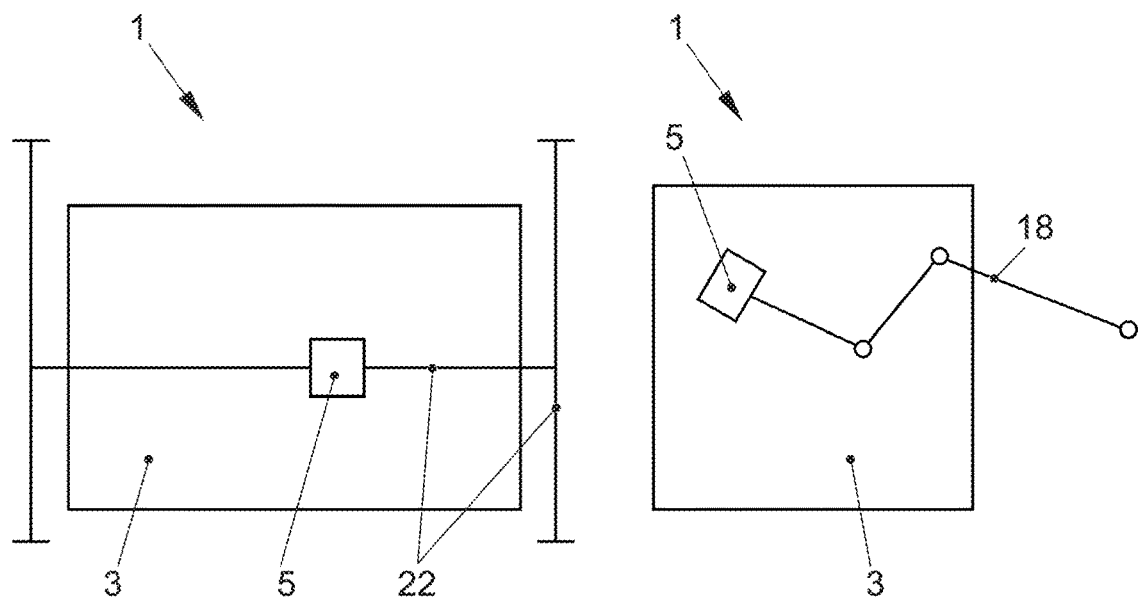
FIG. 3 shows an embodiment with an XY portal and an XY articulated robot.

FIG. 3 shows possible embodiments of apparatus 1, wherein in the left part of FIG. 3, build group 5 is located above build platform 3 on the XY portal 22, and in the right part of FIG. 3, it is located on the XY articulated robot 18.

Figure 4A:
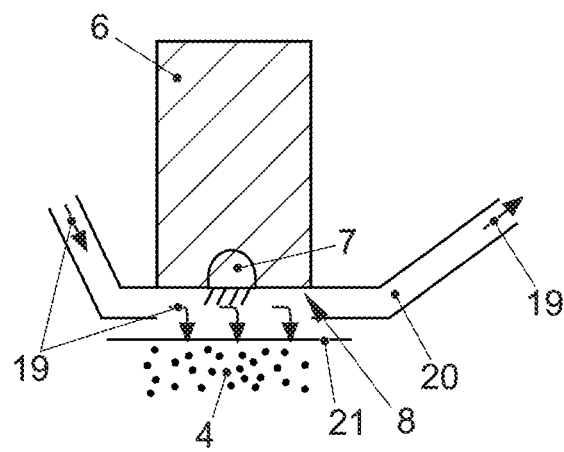
FIGS. 4a, 4b, 4c show embodiments of irradiation units.

FIG. 4a shows irradiation unit 6, which has a plurality of irradiation elements 7 on underside 8. In this case, irradiation unit 6 or irradiation elements 7 are protected from the back-flowing raw material 4 by means of protective gas flow 19, which forms protective barrier 21 by exiting from flow channel 20.

Figure 4B:
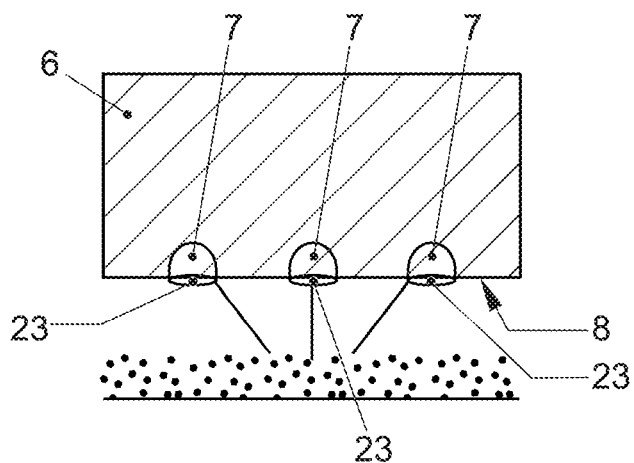
Figure 4C:
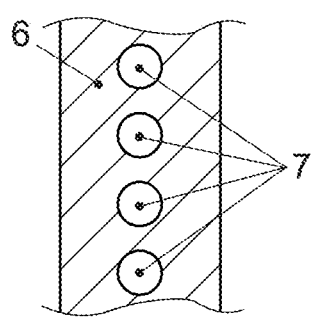

FIGS. 4b and 4c each show an irradiation unit 6 with a plurality of irradiation elements 7. Irradiation elements 7 shown in FIG. 4b are configured here as laser diodes, which each require an additional optical system 23 for beam shaping and/or beam focusing, which in this embodiment is arranged below irradiation elements 7 formed as laser diodes. In contrast, the irradiation elements shown in FIG. 4c are designed as VCSEL diodes, which do not require an additional optical system 23.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An apparatus for producing a three-dimensional object, the apparatus comprising:
    an application unit to build up the three-dimensional object from at least one material layer by selective solidification of at least one powder raw material applied successively to a build platform; and
    an irradiation unit adapted to solidify the at least one powder raw material via an energy input from a beam, the irradiation unit and the application unit forming a build group, and the irradiation unit comprising a contiguous group of irradiation elements, is rotatably mounted on the application unit.

2. The apparatus according to claim 1, wherein the irradiation elements are provided on an underside of the irradiation unit facing the build platform, and wherein the irradiation elements are formed as laser diodes for producing radiation formed as a laser beam.

3. The apparatus according to claim 1, wherein the irradiation elements are controlled individually.

4. The apparatus according to claim 2, wherein the laser diodes are VCSEL diodes and/or VECSEL diodes.

5. The apparatus according to claim 2, wherein the irradiation unit includes at least 100, between 100 and 1000, or more than 1000 of the laser diodes.

6. The apparatus according to claim 1, wherein the apparatus includes at least two of the application unit or at least two of the build group.

7. The apparatus according to claim 1, wherein a width of the at least one powder raw material applied successively to the build platform via the application unit and/or a width of an irradiation area covered by the irradiation unit in the at least one powder raw material applied to the build platform are 0.5 millimeters to 2 millimeters.

8. The apparatus according to claim 1, wherein the application unit has a metering device comprising a rotatably arranged first metering plate and a stationary second metering plate working together with the first metering plate, and/or a vibration device for motion activation of the powder raw material.

9. A method of producing a three-dimensional object built up from at least one material layer with the apparatus according to claim 1, the method comprising:
    forming a bed of the at least one powder raw material by successively applying raw material tracks; and
    selectively solidifying the raw material tracks via the energy input from the beam of the irradiation unit that is rotatably mounted on the application unit,
    wherein the successive application of the raw material tracks takes place as a function of a first requirement profile for chemical and/or physical properties of the object to be produced with a layer thickness of the raw material tracks in a first layer thickness range up to 100 micrometers.

10. The method according to claim 9, wherein the successive application of raw material tracks takes place as a function of a second requirement profile for chemical and/or physical properties of the object to be produced for producing support structures to be solidified for the object; and/or for producing areas of the bed, which are not to be solidified, with a layer thickness of the raw material tracks in a second layer thickness range of 100 micrometers to 2 millimeters.

11. The apparatus according to claim 1, wherein the irradiation unit is rotatably mounted directly on the application unit.

12. The apparatus according to claim 1, wherein the application unit has an outlet opening through which the at least one powder raw material exits the application unit, and wherein the irradiation unit is rotatably mounted to an exterior side surface of the outlet opening, such that the irradiation unit surrounds the exterior side surface of the outlet opening.

13. The apparatus according to claim 12, wherein the irradiation unit is rotatably mounted to the exterior side surface of the outlet opening via bearings.

14. The apparatus according to claim 1, wherein the application unit has a metering device comprising a rotatable first metering plate and a stationary second metering plate, wherein each of the rotatable first metering plate and the stationary second metering plate have through-holes that allow the at least one powder raw material to flow from a reservoir of the application unit to an outlet opening of the application unit, and wherein the stationary second metering plate is positioned between the rotatable first metering plate and the outlet opening.

* * * * *